No. 773,486. PATENTED OCT. 25, 1904.
B. DUBINSKI.
SOUND REPRODUCING MACHINE.
APPLICATION FILED MAY 17, 1904.
NO MODEL. 8 SHEETS—SHEET 1.

Fig. 1.

Witnesses
Benjamin Dubinski, Inventor.
by
Attorneys

No. 773,486. PATENTED OCT. 25, 1904.
B. DUBINSKI.
SOUND REPRODUCING MACHINE.
APPLICATION FILED MAY 17, 1904.
NO MODEL. 8 SHEETS—SHEET 2.

Fig. 2.

Witnesses
E. H. Stewart
Jno. E. Parker

Benjamin Dubinski,
Inventor.
by C. A. Snow & Co.
Attorneys

No. 773,486. PATENTED OCT. 25, 1904.
B. DUBINSKI.
SOUND REPRODUCING MACHINE.
APPLICATION FILED MAY 17, 1904.
NO MODEL. 8 SHEETS—SHEET 3.

Fig. 3.

Witnesses
E. F. Stewart
Geo. E. Porter

Benjamin Dubinski, Inventor.
by C. A. Snow & Co.
Attorneys

No. 773,486. PATENTED OCT. 25, 1904.
B. DUBINSKI.
SOUND REPRODUCING MACHINE.
APPLICATION FILED MAY 17, 1904.
NO MODEL. 8 SHEETS—SHEET 4.

Fig. 4.

Witnesses
E. F. Stewart
Jno. E. Parker

Benjamin Dubinski,
Inventor.
by C. A. Snow & Co.,
Attorneys

No. 773,486. PATENTED OCT. 25, 1904.
B. DUBINSKI.
SOUND REPRODUCING MACHINE.
APPLICATION FILED MAY 17, 1904.
NO MODEL. 8 SHEETS—SHEET 5.

Witnesses
E. F. Stewart
Jno. E. Parker

Benjamin Dubinski,
Inventor.
by C. A. Snow & Co.
Attorneys

No. 773,486. PATENTED OCT. 25, 1904.
B. DUBINSKI.
SOUND REPRODUCING MACHINE.
APPLICATION FILED MAY 17, 1904.
NO MODEL. 8 SHEETS—SHEET 6.

Witnesses
E. H. Stewart
Jno E. Parker

Benjamin Dubinski,
Inventor.
by C. A. Snow & Co.
Attorneys

No. 773,486. PATENTED OCT. 25, 1904.
B. DUBINSKI.
SOUND REPRODUCING MACHINE.
APPLICATION FILED MAY 17, 1904.
NO MODEL. 8 SHEETS—SHEET 7.

Witnesses
E. F. Stewart
Jno. E. Parker

Benjamin Dubinski,
Inventor.
by C. A. Snow & Co.
Attorneys

No. 773,486. PATENTED OCT. 25, 1904.
B. DUBINSKI.
SOUND REPRODUCING MACHINE.
APPLICATION FILED MAY 17, 1904.
NO MODEL. 8 SHEETS—SHEET 8.

Witnesses
Benjamin Dubinski, Inventor.
Attorneys

No. 773,486. Patented October 25, 1904.

UNITED STATES PATENT OFFICE.

BENJAMIN DUBINSKI, OF SAN ANTONIO, TEXAS.

SOUND-REPRODUCING MACHINE.

SPECIFICATION forming part of Letters Patent No. 773,486, dated October 25, 1904.

Application filed May 17, 1904. Serial No. 208,420. (No model.)

*To all whom it may concern:*

Be it known that I, BENJAMIN DUBINSKI, a citizen of the United States, residing at San Antonio, in the county of Bexar and State of Texas, have invented a new and useful Sound-Reproducing Machine, of which the following is a specification.

This invention relates to sound-reproducing machines, and especially to a machine of that general class in which a plurality of records are presented successively to a single sound-box.

The principal object of the invention is to provide an improved machine of the multiple-record type in which each separate record is independently revolved during its reproduction while the remaining records are idle and, further, to so arrange the driving mechanism that each record-carrier serves as a means for imparting movement to the sound-box and its connected mechanism.

A further object of the invention is to provide a machine of this class in which mechanism of simple and economical construction is so arranged that the records are automatically shifted to present them in successive order in front of the sound-box, provision being made for preventing the operation of the shifting mechanism, so that when necessary a record may be repeated.

A further object in this connection is to provide means whereby any person may readily shift the records in order to bring any desired record into playing position and, further, to so arrange the manually-operable shifting mechanism as to prevent movement of the records during the operation of the machine, so as to prevent injury to the records.

A still further object of the invention is to provide an improved sound-box controlling and shifting mechanism for automatically returning the sound-box to its initial position after a reproduction.

A still further object is to provide means whereby in the failure of any part of the mechanism the sound-box will be raised at the completion of a reproduction and automatically returned to the starting-point.

A still further object of the invention is to provide a multiple-record carrier in which the whole frame is moved rearward away from the sound-box during the shifting of the record-carriers.

A still further object of the invention is to provide improved means whereby the speed of operation of the machine may be readily controlled in accordance with the speed at which the records have been produced.

With these and other objects in view, as will more fully hereinafter appear, the invention consists in the novel construction and arrangement of parts hereinafter fully described, illustrated in the accompanying drawings, and particularly pointed out in the appended claims, it being understood that various changes in the forms, proportions, size, and minor details of construction may be made without departing from the spirit or sacrificing any of the advantages of the invention.

In the accompanying drawings.

Similar numerals of reference indicate similar parts in each of the figures of the drawings.

The machine forming the subject of the present invention is one of that class in which a plurality of phonograph or graphophone records are arranged in an annular series to be presented successively in alinement with a sound-box and a sound-box carrier.

The working parts of the machine are supported on a suitable base 1, at the front of which are hollow standards 2 for the reception of posts 3, which may be adjusted vertically in the standards and locked in position by set-screws 4. These posts serve as supports for a horizontally-disposed frame 5, having at its opposite ends bearings for the reception of a screw-shaft 6. The screw-shaft extends, as usual, through a sound-box carriage 7, which supports a sound-box 8 of any ordinary type. At one side of the sound-box carrier is provided a lever 9, carrying a half-nut which may be engaged with the threaded shaft 6, and the rear end of the lever is bent under the net portion of the sound-box, so that when the threaded portion is moved from engagement with the shaft by depression of the front end of the lever its rear and bent end will raise the sound-box from engagement with the record. To the screw-shaft is pivoted a pair of arms 11 and 12, disposed, preferably, at the ends of the shaft and serving as supports for a rod 14, which fits within the recessed outer end of the lever 9. In front of the rod 14 is a guard 15 of the usual construction, and to the front of this guard is secured a lug 16, connected by a link 17 to one end of a lever 18, that is pivoted at a point intermediate of its length to a lug or standard 19, carried by the base-plate. The opposite end of the lever is operated upon by a cam mounted on a cam-shaft 21, hereinafter described, and operated in such manner that it will at times come into engagement with the lever 18 and by depressing its inner end will raise the outer end of the lever 9 and force the threaded portion of said lever into engagement with the traversing-shaft 6 and at the same time the sound-box will be lowered until the lever lies in engagement with the record.

In order to hold the lever 9 in proper position during the travel of the sound-box, the lever or arm 12 when elevated is locked in position by a pin 22, extending through a guiding-opening in the end portion of the fixed frame 5 and normally held in locking position by means of a coiled compression-spring 23. Secured to the locking-pin is a disk or arm 24, adapted to be engaged by a pin 25, carried by the lower portion of the sound-box carrier, and when a record has been reproduced this pin will engage the disk and force the same outward until the pin 22 has been removed from under the arm 12, allowing said arm to fall, the arm, the guard, and the rod 14 being moved downward by a weight 26, secured by a cord or chain to the front portion of the lever 18. This immediately removes the threaded portion of the lever from engagement with the traversing-shaft and at the same time elevates the sound-box proper from engagement with the record. The sound-box is then drawn back to its initial position by means of a weight 27, carried by a suitably-guided cord or chain 28.

On the end of the screw-shaft is secured a small pinion 29, intermeshing with a gear 30, that is carried by a stud-shaft mounted on an arm projecting from the fixed frame, and movement is imparted to the gear 30 from the several record-carriers in the manner hereinafter described. To the base-plate is secured a bar or sill 32, carrying a number of brackets or standards 33, in which is mounted a pivot-shaft 34, and to the shaft 34 is secured a U-shaped frame 35, having a pair of parallel approximately vertical arms the upper ends of which have bearing-openings for the reception of a horizontal shaft 36. To the shaft 36 is keyed a disk 37, to which are secured a number of mandrel-carrying shafts 38, each of said shafts being provided at a point adjacent to the disk with a cone 39. On each of the shafts 38 is placed a mandrel 40, adapted for the reception of the cylindrical records usually employed in phonographs, graphophones, and similar sound-reproducing machines. At one end of the mandrel is a pinion 41, adapted to engage with the gear-wheel 30 and transmit motion to the sound-box and sound-box carriage, and this end of the mandrel is also provided with a friction-surface 42, with which engages a small friction-roller for the purpose of transmitting rotative movement to said mandrel. The opposite end of the mandrel is held in place by an adjustable cone 43, mounted on the mandrel-shaft and locked in adjusted position by means of a set-screw. The outer ends of the mandrel-shafts are all secured to a ring 44 by means of screws 45, so that they may be held in properly-spaced relation, the shafts being rigid and the mandrels revolving freely on the cone-bearings 39 and 43.

The frame 35 is provided with a forwardly-projecting arm 46, with which engages a cam 47, mounted on the horizontally-disposed shaft 21, that is supported in bearing-brackets 49 on the base-plate, the operation of the cam being resisted by a spring 50, bearing at one end on a vertical post or standard 51 and at the other end on a washer 52, carried by an adjustable set-screw 53. The set-screw 53 passes through a threaded opening in an arm 54, projecting toward the rear of the frame 35, and when acted upon by the spring the frame is rocked on the shaft 34 and moved forward until one of the mandrels and its record are presented in proper position for the reproduction of said record. At the end of each reproduction a cam 47 acts to move the frame 35 and all of the records to the rear, so that the mandrel-carrying disk will be free to rotate without danger of injuring any of the articles. The shaft 36 is further provided with a ratchet-wheel 57, having a number of teeth corresponding to the number of mandrel-shafts, and these teeth are successively engaged by a pawl 58, carried by a lever 59, the lever and pawl being connected by means of a tension-spring 60' in order that said pawl may be held in operative position. The lever 59 is mounted on a pin 60, held between bracket means 61, that project from a rearwardly-extending arm 62, secured to the frame 35, and said lever is engaged by a cam 61, carried by the shaft 48, immediately after the backward movement of the frame 35 or during such backward movement, and the pawl 58 is moved up to an extent sufficient to rotate the ratchet and record-carrying disks to the extent of a single tooth, and thus move a fresh record into position for playing.

In order to correct the movement of the pawl and insure the stopping of the mandrel-carrying disk in proper position, the shaft 36 is provided with a centering-wheel 64, having notches of a number equal to the number of ratchet-teeth, and these notches receive an antifriction-roller 65, carried by a pivotally-mounted arm 66, that is held up in proper position by a helical compression-spring 67, extending between the rear edge of the arm and an upturned ear at the end of the arm 62. Should the movement of the pawl be greater or less than that required to present a fresh record to playing position, the entrance of the spring-pressed antifrictiction-roller into one or the other of the notches of the centering-disk will correct this movement and the records will at all times be stopped in proper position. The shaft 36 further carries an annular band 68, having a plurality of spokes 69, radiating from a hub member that is secured to the shaft, and on this band are placed cards bearing the names of the several selections on the records, there being one card for each record and these being successively displayed through an opening 70, formed in a curved guard 71, that surrounds the greater portion of the card-carrying band. The title displayed is always the title of the record then in position for playing; but should the operator wish to hear another selection provision is made for the turning of the record-carrying disk until the proper title appears at the display-opening. At the front portion of the machine is a frame 73, having a pair of guiding-openings for a longitudinally-movable bar 74, one end of which projects out through an opening in the front of the casing and is provided with a thumb-piece or push-button 75. This rod or bar is normally held out by means of a coiled compression-spring 76, bearing at one end against the frame 73 and at the opposite end against a collar 77, carried by the rod and held in position by a set-screw, so that it may be adjusted in order to alter the stress of the spring. The rear edge of the rod 74 is guided in an opening formed in a bracket 78, and at a point intermediate of the length of the rod is a spring-pressed pawl 79 in position to engage the ratchet-disk 57, such as when the push-rod 74 is forced inward the pawl 79 will engage a fresh tooth of the ratchet-disk and upon release of the rod the spring 76 will again force it outward, when the ratchet-disk will be advanced to the extent of a single tooth, thus presenting another record to the sound-box and displaying the title of such record at the opening 70, and in this way the operator may turn the mandrel-carrying disk to any desired extent.

The manual adjustment of the mandrel-carrying disk, as well as the automatic adjustment, can be accomplished only when the frame 35 is tilted rearward, and when the records are not in playing position the one nearest the sound-box will be at all times slightly spaced therefrom, so that there will be no danger of injury to the records by the turning of the mandrel-carrying disk. In the present instance this is accomplished by providing in the push-rod 74 a small lug or finger 80, the outer face of which is inclined, and on the rear face of the frame 73 is mounted a slidable locking-block 81, having a pair of slots 82, through which extend guiding-screws 83. This locking-block 81 has an opening 84 of a height sufficient to permit the passage of the push-rod and its lug 80; but when the locking-block is in its lowest position the upper wall of said opening will be in contact with the upper face of the rod and any inward movement of the push-rod 74 will be prevented by engagement of the lug 80 with the outer face of the block. The side of the block is provided with a pair of pins 85, between which plays an arm 86, carried by or forming a part of the cam-operated arm 46 of the frame 35. In the operation of this portion of the mechanism movement of the frame 35 to the rear or to inoperative position will move the arm 86 against the upper of the pins 85 and will raise the block 81 to an extent sufficient to permit the free passage of the lug 80 of the push-rod. When the frame is moved forward or to playing position, the arm 86 will engage the lowermost of the pins 85 and will depress the latter to an extent sufficient to prevent the passage of the lug 80, so that it will be impossible to operate the push-rod when any of the records are in engagement with the sound-box.

It is sometimes desirable to repeat a record the reproduction of which has just been finished, and for this purpose it is necessary to prevent the operation of the automatically-operating shifting-pawl 58. The frame 75 is provided with bearing-openings for the support of a pull-rod 87, the outer end of which projects through an opening in the front of the casing and is provided with a handle or pole 88. The inner end of the rod is provided with an arm extending around the rear portion of the pulley 58, and should the operator desire to repeat the record already played he will pull the repeating-rod 87 outward, and thus move the pawl 58 out of engagement with the teeth of the ratchet-disk 57, so that subsequent movement of the pawl-operating cam will be ineffectual. The upper face of the repeating-rod 87 is provided with a pair of locking-notches 90, with which may engage a spring locking-pawl 91 in order to hold the repeating-rod in adjusted position, while in order to prevent pushing inward of the rod 87 a stop-block 92 is employed.

In order to prevent excessive forward movement of the rocking frame 35 under the influence of the spring 50, a threaded stop-rod 92 is mounted in a standard 93 on the base and is provided with lock-nuts 94, which may be adjusted in order to prevent excessive movement of the frame in either direction. The pin extends through an opening formed in a flange 95, carried by or forming a part of the cam-actuating lug 46.

The shaft 21 carries a rocking frame 100, which carries at its upper end a shaft 101, extending inward within the annular series of mandrels. On the extreme inner end of the shaft is secured a friction-wheel 102, formed of or covered with rubber or other suitable material, and this friction-wheel is adapted to engage against the friction-surfaces 42 of the several mandrels as the latter are successively presented to playing position. The movement imparted to this shaft is thus transmitted through the friction members 102 and 42 to the mandrel and from thence to the gear 40, to the gears 30 and 29 for the operation of the sound-box-traversing shaft. Near the outer end of the shaft 101 is a belt-wheel 103, over which passes a belt 104, leading to a pulley 105 on a counter-shaft 106, adapted to suitable bearings under the base-plate. The shaft 106 carries a large pulley 107, that is connected by a driving-belt 108 to a pulley 109 on the armature-shaft of a motor 110, the latter being of any suitable construction. In the motor-circuit is arranged a switch 111, by means of which the current may be manually cut off, and in this circuit is connected a rheostat 112, so that more or less resistance may be cut in in order to control the speed at which the records are played. On the extreme outer end of the shaft 101 is a worm 113, which engages a worm-wheel 114 on an approximately vertical shaft 115. This shaft is held in upper and lower bearings formed by ears projecting on one side of the rocking frame 100. At the lower end of shaft 115 is a worm 116, intermeshing with a worm-wheel 117 on the shaft 21, and the gears are so proportioned that the shaft 21 will be turned a single revolution for the reproduction of each record, the several cams on the shaft 21 being so adjusted as to operate in proper order for the movement of the several parts which they control.

In order to force the frame 100 forward, and thus keep the driving-roller 102 in frictional contact with the mandrel which it is to revolve, the frame is provided with a rearwardly-projecting arm 120, carrying a set-screw 121, on which is a collar 122, forming a bearing for a compression-spring 123. The lower end of the spring rests on a standard 124, carried by the base, and the function of the spring is to throw the rocking frame forward and maintain the friction-roller in positive engagement with the mandrel.

To one of the brackets or standards 33 is pivoted a bell-crank lever 125, having an approximately horizontal arm that is operated upon by a cam 127 on the shaft 48 and an approximately vertical arm that is connected by a link 128 to the rocking frame 100. When the cam operates on the bell-crank lever, the movement is transmitted by the link 128 to the frame 100, and the latter is thrown to the rear to an extent sufficient to move its anti-friction-wheel 102 from engagement with the mandrel, so as not to interfere with the subsequent adjustment of a fresh mandrel to playing position.

The rearward movement of the frame 100 occurs at the completion of each reproduction, and at this time it is necessary to provide for the return of the sound-box and its carriage to its initial position. For this purpose the frame 5 is provided with bearings 130 for the reception of a rock-shaft 131, having one arm, 132, adapted to engage the inner face of the disk 24. Upon the opposite end of the shaft is a rocker-arm 133, that is connected by a link 134 to the rocking frame 100, and when this frame is moved to the rear the shaft 131 will be rocked to an extent sufficient to move the arm 132 against the disk 24, and thus withdraw the pin 22 from its locking engagement with the arm 12, whereupon the weight 26 will shift the lever 9 in the manner previously described, and the carriage will be returned to initial position by means of the weight 27. This is accomplished at the same time with each of the records, the latter presumably being of exactly the same length, but in event of failure of this portion of the mechanism the rod 25, that projects from the sound-box carriage, will effect the unlocking movement of the pin 22 in order to allow the return of the sound-box.

In order that the casing may be as nearly air-tight as possible, the trumpet 135, which projects in the usual manner from the sound-box, is carried by a slide 136 of a length equal at least to the length of one of the mandrels, and this slide is guided between a pair of slotted pipes 137 in the front of the casing, so that the casing will be at all times closed.

At a point adjacent to the main ratchet-disk is an inverted-U-shaped frame 140, to the upper cross-bar of which is pivoted a lever 141. This lever, which may be formed of any suitable material, is provided near one end with a block 142 of insulating material and with a contact-strip 143, formed of copper or other good conducting material. Below the lever is arranged a block 144, carrying a pair of spring-contacts 145, which form the terminals of the motor-circuit, the upper ends of said contact-strips resting against the insulating-block 142 when the parts are in inoperative position. The outer portion of the lever passes under a guide 146, and its extreme end portion is engaged by a catch 147, pivoted on a pin 148, the tail of the catch projecting through an opening 149 into a coin-chute 150. When a coin of proper value is deposited in the chute, it will in falling strike the tail of the catch and move the latter against the stress of a spring 151 to releasing position. A spring 152, secured to the front end of the lever 141, then shifts the position of the lever until the contact-spring 143 engages the two contacts 145 and establishes the motor-circuit, after which the parts continue to operate until the record has been reproduced, and at the completion of this operation the current will be broken and the motor stopped.

Figure 1:
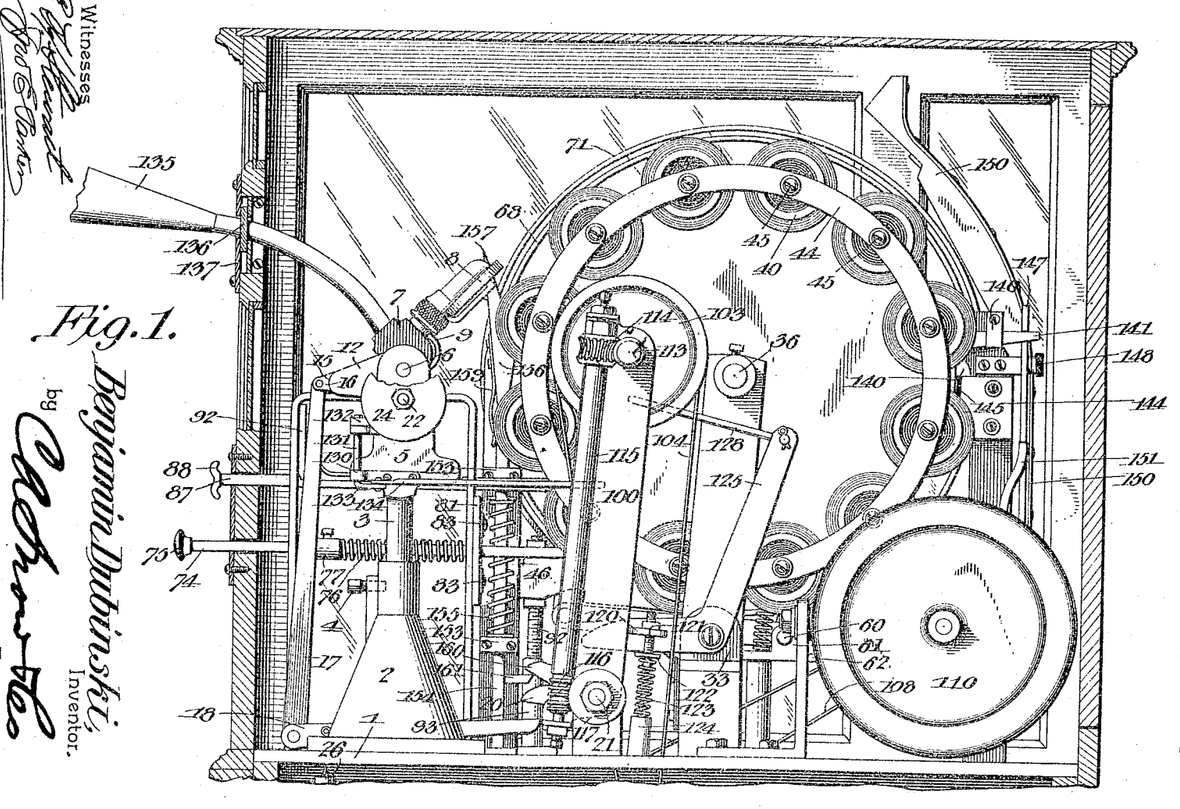
Figure 1 is a view in end elevation of a sound-reproducing machine constructed in accordance with the invention, the casing being shown in section.
Figure 2:
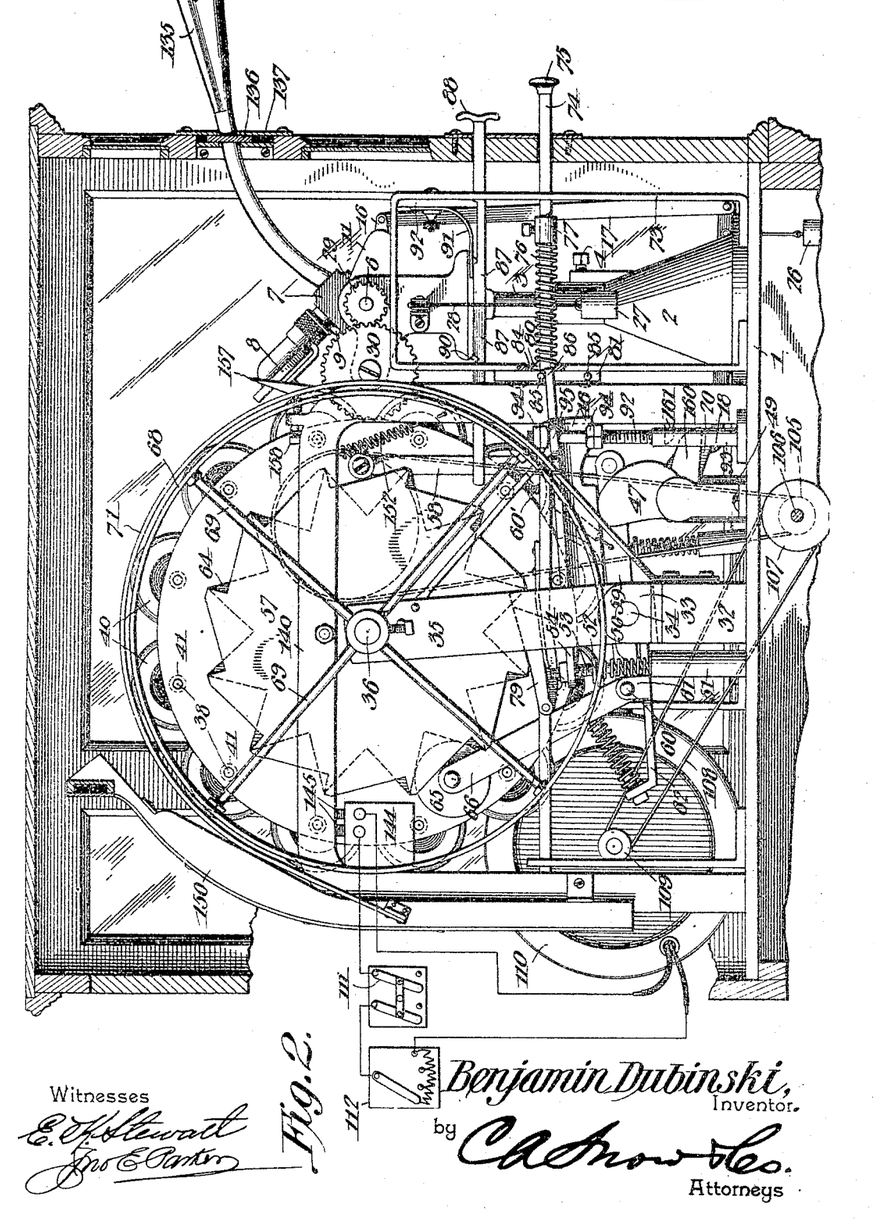
Fig. 2 is a similar view looking from the opposite end of the machine.
Figure 3:
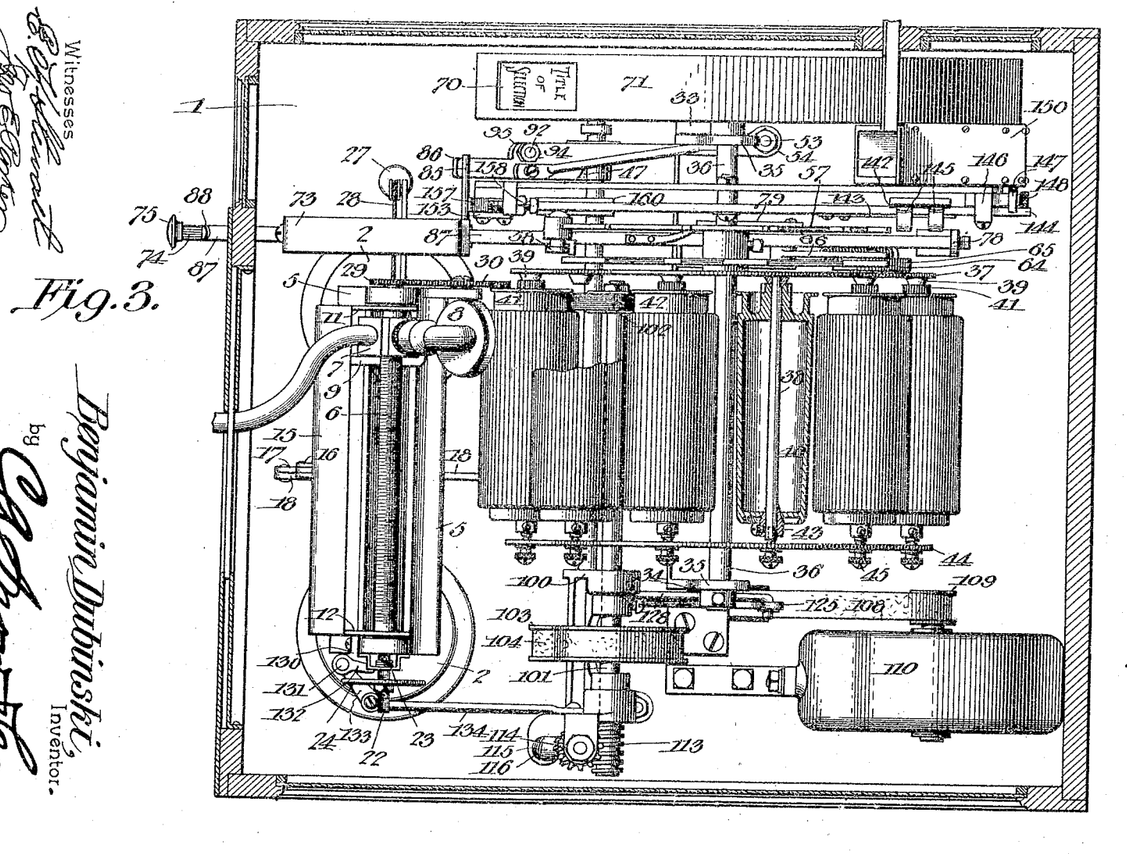
Fig. 3 is a front elevation of the machine with the casing removed.
Figure 4:
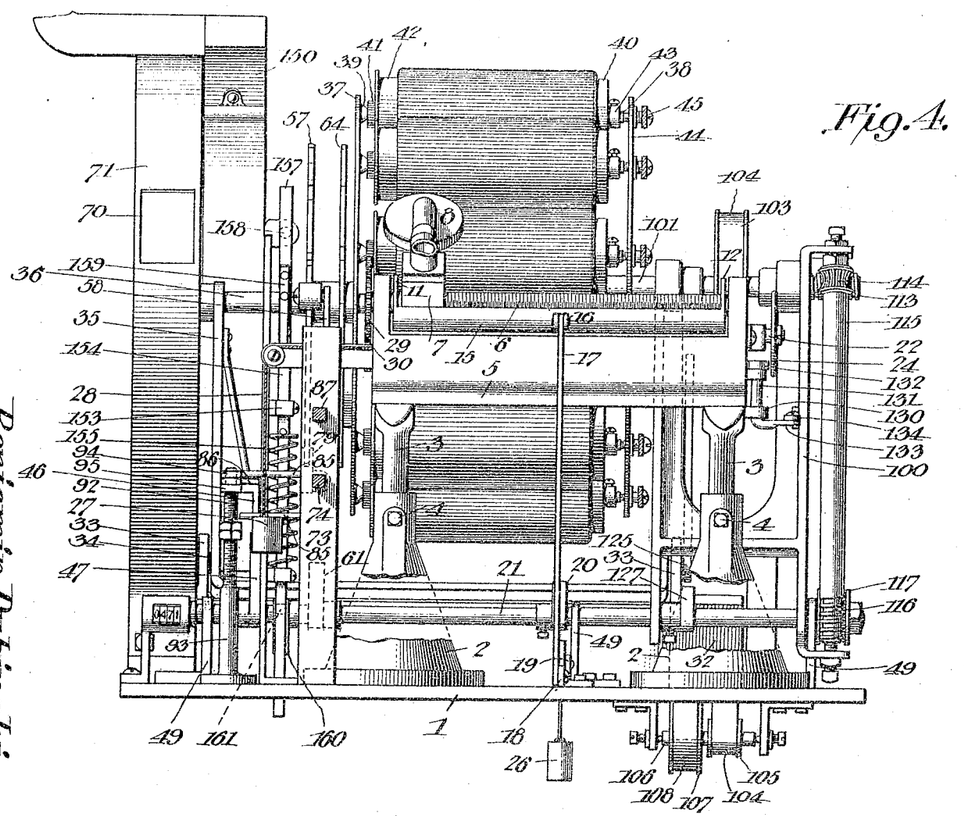
Fig. 4 is a plan view of the machine, partly in section.
Figure 5:
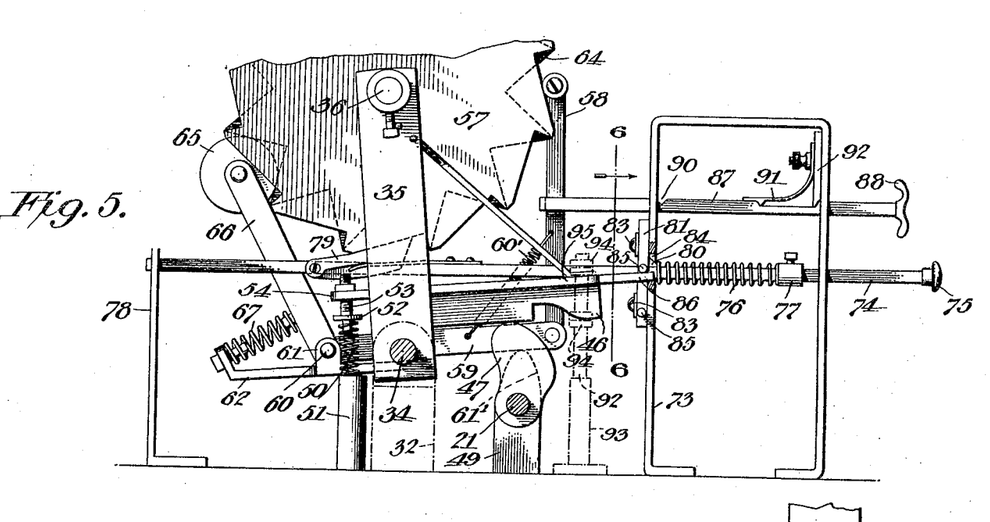
Fig. 5 is a detail end elevation, partly in section, illustrating principally the mechanism for controlling the shifting of the records.
Figure 6:
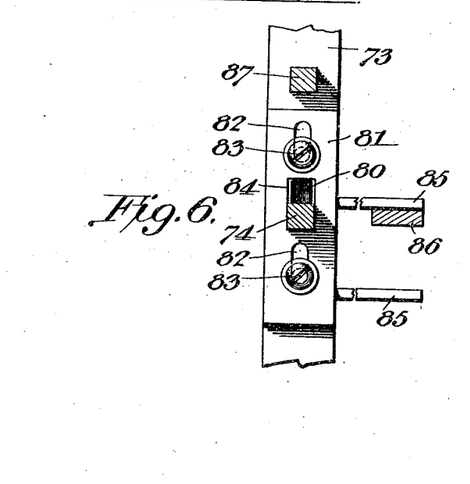
Fig. 6 is a sectional elevation of a portion of the same on the line 6 6 of Fig. 5.
Figure 7:
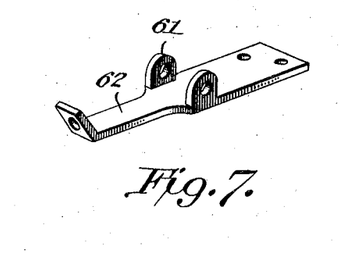
Fig. 7 is a detail perspective view of one of the frame-arms more specifically described hereinafter.
Figures 8, 9:
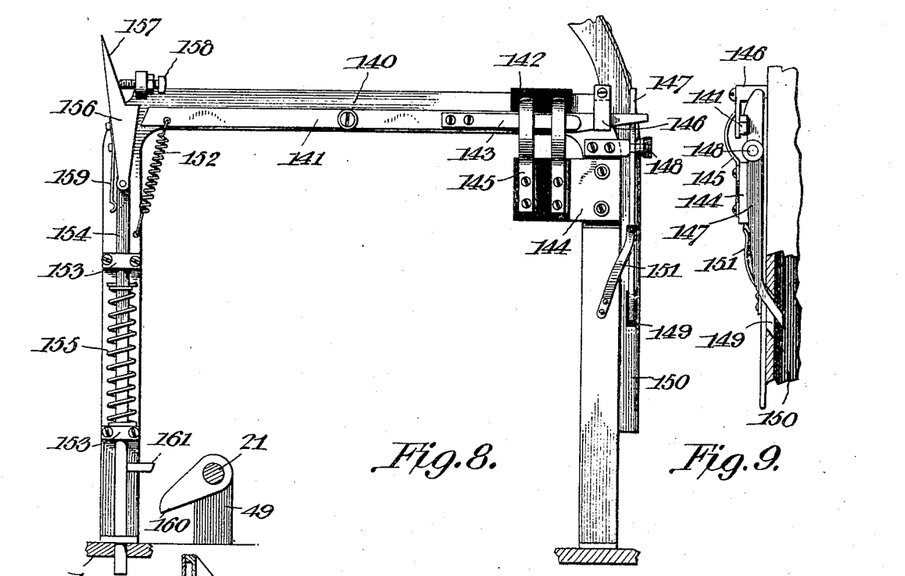
Fig. 8 is a detail elevation, parts being shown in section, of the starting mechanism operable by the insertion of a coin or check.
Fig. 9 is a detail view of a portion of the same looking in the direction of the arrow, Fig. 8, parts being shown in section.
Figure 10:
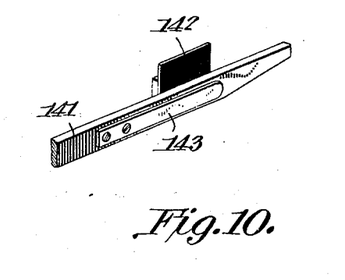
Fig. 10 is a detail perspective view of a portion of the circuit-closing lever.
Figure 11:
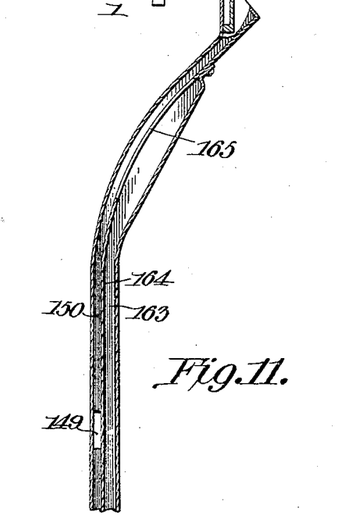
Fig. 11 is a detail sectional view of the coin-chute.
Figures 12, 17:
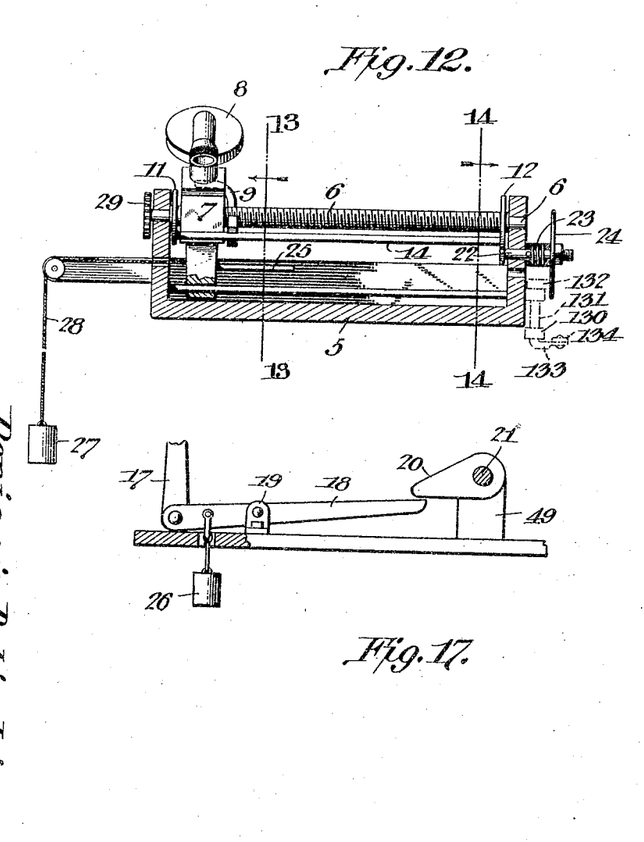
Fig. 12 is a front elevation of the sound-box and its associated mechanism, the carrying-frame being shown in section.
Fig. 17 is a detail view of the cam and lever for transmitting movement to the threaded lever of the sound-box mechanism.
Figure 13:
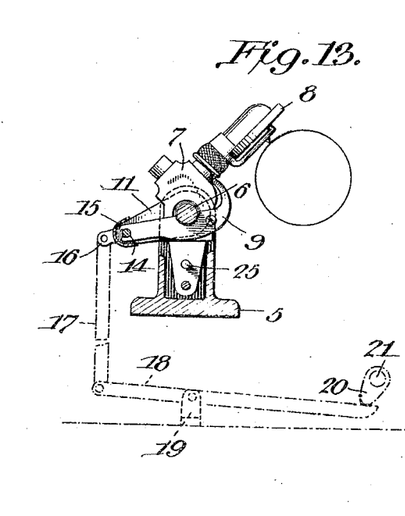
Fig. 13 is a sectional elevation of the same on the line 13 13 of Fig. 12.
Figure 14:
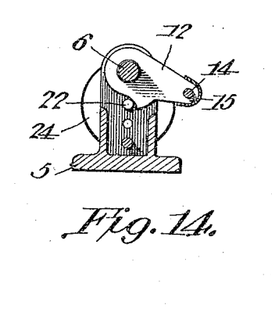
Fig. 14 is a similar view on the line 14 14 of Fig. 12.
Figure 15:
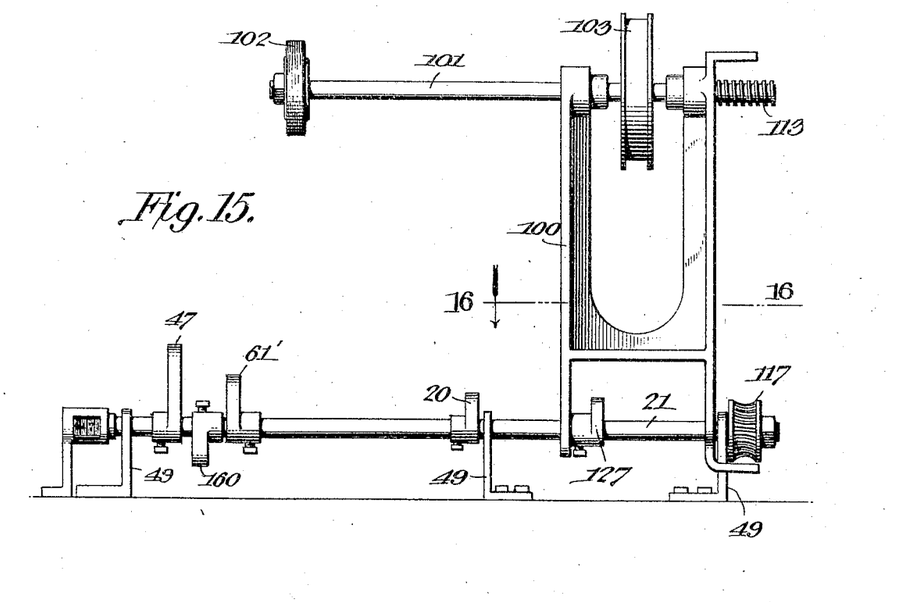
Fig. 15 is an elevation of one of the frames and illustrating more particularly the mechanism for imparting movement to the record-carriers.
Figure 16:
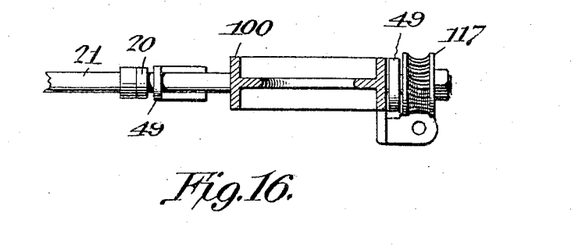
Fig. 16 is a sectional plan view of a portion of the structure on the line 16 16 of Fig. 15.

The front bar of the frame 140 is provided with a pair of guides 153 for the reception of a vertically-movable bar 154, normally held in alined position by a helical compression-spring 155. The upper end of the bar 154 carries a pawl 156, from which projects an inclined tongue or cam 157, adapted to engage against a set-screw 158, carried by a lug projecting from the frame, and the pawl is normally held in such position that the tongue will engage this screw by means of a spring 159, carried by the pawl and bearing against the main body of the bar. The parts being normally in the position shown in Fig. 8, downward movement of the frame of the bar and the cutting in of the motor will not be interfered with. Near the completion of the reproduction of the record a cam 160 on the cam-shaft 48 will engage a lug 161, projecting from the bar, and will depress the same until the approximately horizontal shoulder of the pawl is below the end of the lever 141. After a short time the cam 160 will pass beyond the lug 161 and release the same, whereupon the spring 155 will elevate the bar 154 and the pawl will raise the lever 141 until the rear end of said lever is again engaged by the catch 147 and locked in position with the circuit broken. Continued upward movement of the pawl will cause the tongue 157 to ride against the end of the screw 158, and said pawl will be moved outward from engagement with the lever 151, leaving all of the parts in proper position for a subsequent operation.

In order to prevent the manipulation of the machine by slugs or coins of a diameter less than of a standard coin, such as a nickel, the coin-slot is divided into two branches 150 and 163, these being divided by a partition 164, a portion of which is curved or inclined and is provided with a slot 165 of a width but slightly less than that of the standard coin. If a coin of smaller denomination or a slug or other article of less diameter than a standard coin is inserted in the slot, it will pass through the opening 165 to the branch 163 of the coin-chute and will be deposited in the coin-receptacle or in a different receptacle without, however, operating the machine.

The operation of the machine in brief is as follows: When a coin of proper denomination is inserted in the coin-chute, it will strike the catch 147 and move the same to release the lever 141, whereupon the latter will move until the contact-strip 143 engages the contacts 145 and closes the motor-circuit. The first operation is to move the operating-cam of rocking frame 35 from contact with arm 46, allowing the frame to swing forward until one of the records is presented to the sound-box, and at the same time or at any time previous to this the cam 28 is operated to allow the sound-box to move to record-engaging position. The rocking frame 100 then moves forward until the friction-wheel 102 is in engagement with the mandrel of the record to be played, and the movement of the motor is then transmitted to the belt-wheel 103, causing the record to revolve at proper speed. The movement of the record-mandrel is transferred through the friction-wheel 102 and friction-suface 42 to the gear 30 and thence to the pinion 29 of the sound-box-traversing shaft. The operation continues until the completion of the record, and at this time the cams are so arranged that the frame 35 will first be swung to the rear and the pawl-bar will be elevated to automatically shift the mandrel-carrying frame and present a fresh record to playing position. Immediately following this operation the rocking frame 100 will move from the rear and the rock-shaft 131 will be turned until arm 132 forces the disk 24 outward and releases the locking-pin 22. This permits the weight 27 to restore the sound-box and sound-box carriage to initial position. The only further movement necessary is for the cam 160 to operate the bar 154 and through the pawl 156 restore the circuit-controlling lever 141 to its initial position.

On the end of the shaft 48 is connected a counter 166, so arranged as to accurately register the number of operations of the machine, said shaft turning once during the reproduction of each record.

Having thus described the invention, what is claimed is—

1. In a sound-reproducing machine, a record-carrier, a sound-box, and means for automatically moving both in directions away from each other at the completion of a reproducing operation.

2. In a sound-reproducing machine, a plural record-carrier, a sound-box, means for automatically moving both members away from each other at the completion of a sound-reproducing operation, and means for moving the members toward each other in advance of the starting of a reproducing operation.

3. The combination with a sound-reproducing machine, of a sound-box, a plural record-carrier, a rocking frame carrying the same, and means for moving said frame.

4. In a sound-reproducing machine, the combination with a sound-box, of a plural record-carrier, a pivotally-mounted frame supporting the same, and a cam for moving the frame away from the sound-box.

5. In a sound-reproducing machine, a plural record-carrier, a pivotally-mounted frame supporting the same, a cam for moving the frame away from the sound-box, and a spring tending to move the frame in the direction of the sound-box.

6. In a sound-reproducing machine, a sound-box, a plural record-carrier, a spring operating to move said carrier in the direction of the sound-box, and means for limiting the movement of the carrier.

7. In a sound-reproducing machine, a sound-box, a sound-box-traversing mechanism, a plurality of record-carrying mandrels, and a mandrel-support movable bodily toward and from the sound-box and revoluble to present any of the mandrels in operative relation to said sound-box.

8. In a sound-box-reproducing machine, a sound-box, a sound-box-traversing mechanism, a plurality of record-carriers adjustable to reproducing position, actuating means for engaging and revolving the successive carriers as they are brought to reproducing position, and means for transmitting movement to the sound-box-traversing mechanism from the revolving carrier.

9. The combination with a sound-box and sound-box-traversing mechanism, of a record-carrier movable bodily toward and from the sound-box, and gearing connections between the carrier and traversing mechanism, the intermeshing of the gears being accomplished by the movement of the carrier in the direction of the sound-box.

10. In a sound-reproducing machine, a sound-box, a sound-box-traversing mechanism, a record-carrying mandrel movable from and toward the sound-box, and gearing connections between the mandrel and traversing mechanism, such gearing connections being meshed by movement of the mandrel in the direction of the sound-box, and disconnected by movement in the opposite direction.

11. In a sound-reproducing machine, a record-carrying mandrel, a sound-box, means for moving the mandrel toward and from the sound-box, means for transmitting movement from the mandrel to the sound-box-traversing mechanism, and means for revolving the mandrel.

12. In a sound-reproducing machine, a sound-box, a sound-box-traversing mechanism, a mandrel movable toward and from the sound-box, gearing connections between the mandrel and the traversing mechanism, a friction-disk for revolving said mandrel, and means for moving the friction-disk into and out of engagement with the mandrel.

13. In a sound-reproducing machine, a sound-box, a sound-box-traversing mechanism, a plural record-carrier including an annular series of mandrels, means for revolving the carrier to present the successive mandrels to the rear of the sound-box, and a single driving means for independently engaging the mandrels as they are successively presented to playing position.

14. The combination with a sound-box, of a plural record-carrier including an annular series of mandrels, a sound-box, means for revolving the record-carrier to present successive mandrels to playing position, a friction-disk for independently engaging the successive mandrels, and independent means carried by each mandrel for transmitting operative movement to the sound-box.

15. In sound-reproducing machines, a plural record-carrier including an annular series of mandrels, a sound-box, a means for turning the record-carrier to present successive mandrels to playing position, a friction-disk for engaging the successive mandrels, and means for moving the friction-disk toward and from said mandrels.

16. In sound-reproducing machines, a plural record-carrier including an annular series of mandrels, a sound-box, means for moving the record-carrier bodily toward and from the sound-box, means for revolving the carrier to present successive mandrels to playing position, and means for engaging and revolving the successive mandrels.

17. The combination in a sound-reproducing machine, of a sound-box, a sound-box-traversing mechanism, a plurality of record-carrying mandrels, a revolubly-mounted frame supporting said mandrels and movable toward and from the sound-box, and a revoluble friction-disk for engaging the successive mandrels, said disk being movable clear of the path of movement of the mandrels at the end of each reproducing operation.

18. In a sound-reproducing machine, a sound-box, a sound-box-traversing mechanism, a gear for transmitting movement to the traversing mechanism, and a plurality of successively-driven mandrels adjustable to reproducing position, each mandrel having a gear for intermeshing with the gear of the traversing mechanism.

19. In a sound-reproducing machine, a sound-box, a sound-box-traversing means, a plurality of record-carrying mandrels adjustable to reproducing position, of a separate means for transmitting the movement of each independent mandrel to the traversing means.

20. The combination in a sound-reproducing machine, of a sound-box, sound-box-traversing means, a plurality of record-carrying mandrels, a revoluble frame supporting said mandrels, a friction driving roller or disk for engaging each mandrel as it is adjusted to reproducing position, and independent means for adjusting the positions of the frame and the friction driving-roller.

21. In a sound-reproducing machine, a revoluble frame, a plurality of record-carrying mandrels on said frame, a ratchet-wheel connected to the frame, a manually-operable pawl for engaging the teeth of the ratchet-wheel, and means for locking said pawl from movement during a reproducing operation.

22. In a sound-reproducing machine, a revoluble frame, a plurality of record-carrying mandrels supported thereby, a ratchet-wheel secured to the frame, a manually-operable pawl for engaging the teeth of the ratchet-wheel, a pawl-carrying bar, and means for locking the pawl-carrying bar from longitudinal movement during a reproducing operation.

23. In sound-reproducing machines, a revoluble frame, a plurality of mandrels supported by the frame, a ratchet-wheel connected to the frame, a longitudinally-movable pawl-carrying bar, a spring for restoring the same to its initial position, a pawl carried by the bar and engaging the teeth of the ratchet-wheel, and a locking means for engagement with the bar during a reproducing operation.

24. In a sound-reproducing machine, a rocking frame, a revoluble mandrel-carrier supported by said frame, a ratchet-wheel connected to the mandrel-carrier, a longitudinally-movable pawl-carrying bar having a projecting tooth or lug, a pawl supported by the bar and adapted to engage a tooth of the ratchet-wheel, and a slidable locking-block for engagement with the lug, said block being moved to locking and unlocking positions by the rocking frame.

25. In a sound-reproducing machine, a revoluble mandrel-carrier, a ratchet-wheel connected thereto, a pawl for engaging and turning the ratchet-wheel, and a repeating bar whereby the pawl may be moved out of engagement with said ratchet-wheel.

26. In a sound-reproducing machine, a revoluble mandrel-carrier, a ratchet-wheel connected thereto, a pivotally-mounted pawl for turning the ratchet-wheel, a repeating rod or bar engaging the pawl, and means for holding said bar or rod in adjusted position.

27. In a sound-reproducing machine, a plural mandrel-carrier, a ratchet-wheel connected thereto, a pawl for engaging the teeth of the ratchet-wheel, means for operating the pawl at the completion of each reproducing operation, an auxiliary centering-disk having peripheral recesses and a spring-pressed arm engaging in said recesses and serving to stop the mandrel-carrier in proper position.

28. In a sound-reproducing machine, a plural mandrel-carrier, a ratchet-wheel connected thereto, a pawl for engaging the ratchet-wheel, a centering-disk having peripheral notches or recesses, and a pivotally-mounted spring-pressed arm arranged adjacent to the disk and carrying an antifriction-roller adapted to enter the notches or recesses.

29. In a sound-reproducing machine, a rocking frame, a revolubly-mounted mandrel-carrier supported thereby, a sound-box, means for moving the rocking frame toward and from the sound-box, a second rocking frame, a shaft supported thereby and extending within the series of mandrels, means for revolving the shaft, and an antifriction-roller carried by the shaft and adapted to engage the successive mandrels.

30. In a sound-reproducing machine, a revoluble mandrel-carrier, a rocking frame, a shaft supported thereby and extending between the series of mandrels, a friction-disk carried by the shaft and adapted to engage the mandrels as they are successively presented to playing position, means for driving the shaft, a cam-shaft, connections between the two shafts, and a record-carrier-advancing means operable from the cam-shaft.

31. In a sound-reproducing machine, a revoluble mandrel-carrier, a sound-box, a sound-box-traversing means, a rocking frame, a shaft supported thereby, a disk mounted on the shaft and adapted to engage the successive mandrels, and connecting means between the frame and the traversing mechanism whereby at the completion of a record the sound-box will be disengaged from said traversing mechanism.

32. The combination in a sound-reproducing machine, of a revoluble mandrel-carrier, a sound-box, a sound-box carriage, a screw for traversing the carriage, a threaded member supported by the carriage and engaging the screw, a rocking frame, means for connecting the same to said threaded member, a shaft carried by the frame, and a mandrel-driving means supported by said shaft.

33. In sound-reproducing machines, a sound-box, a sound-box carriage, a lever pivoted thereto and provided with a threaded portion forming a half-nut, a screw with which the threaded portion engages, a bar normally maintaining the lever in operative position, pivoted arms carrying said bar, a spring-pressed locking-pin engaging one of the arms, and means supported by the sound-box carriage for moving the pin to releasing position.

34. In sound-reproducing machines, a sound-box, a sound-box carrier, a lever pivoted thereto and provided with a threaded portion, a screw with which such threaded portion engages, a pair of pivotally-mounted arms, a bar carried thereby and engaging the lever, a spring-pressed locking-pin engaging one of the arms, a disk secured to said pin, a releasing-pin supported by the carriage and adapted to engage said disk, a weighted lever connected to the bar and tending to move the threaded lever to disengaging position, and a cam for restoring the parts to operative position.

35. In sound-reproducing machines, a record-carrier, a sound-box, a slotted casing inclosing the same, a trumpet connected to the sound-box and extending through the slot, and a slide movable with the trumpet and closing the slot.

36. In sound-reproducing machines, a record-carrier, a sound-box, a slotted casing inclosing the same, a slide fitted within the slot of the casing, and a trumpet carried by said slide.

In testimony that I claim the foregoing as my own I have hereto affixed my signature in the presence of two witnesses.

BENJAMIN DUBINSKI.

Witnesses:
WALTER O'BRIANT,
WILLIAM SCHIMMELPFENNING.